US011286990B2

(12) United States Patent
Davis et al.

(10) Patent No.: US 11,286,990 B2
(45) Date of Patent: Mar. 29, 2022

(54) SEAL RUNNER WITH DEFLECTOR AND CATCHER FOR GAS TURBINE ENGINE

(71) Applicant: United Technologies Corporation, Farmington, CT (US)

(72) Inventors: Todd A. Davis, Tolland, CT (US); Dale C. Humphries, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 216 days.

(21) Appl. No.: 16/373,879

(22) Filed: Apr. 3, 2019

(65) Prior Publication Data
US 2020/0318687 A1  Oct. 8, 2020

(51) Int. Cl.
*F16C 33/76* (2006.01)

(52) U.S. Cl.
CPC .......... *F16C 33/76* (2013.01); *F16C 2360/23* (2013.01)

(58) Field of Classification Search
CPC ........... F02C 7/06; F01D 25/16; F01D 25/183
See application file for complete search history.

(56) References Cited

U.S. PATENT DOCUMENTS

| | | | |
|---|---|---|---|
| 4,969,652 A | 11/1990 | Munson | |
| 5,301,957 A | 4/1994 | Hwang et al. | |
| 6,322,081 B1 * | 11/2001 | Ullah | F16C 33/76 277/504 |
| 8,678,741 B2 * | 3/2014 | Olennikov | F16J 15/324 415/1 |
| 10,174,845 B2 * | 1/2019 | Fadgen | F16J 15/3268 |
| 2012/0177486 A1 * | 7/2012 | Ullah | F16J 15/3464 415/174.3 |
| 2016/0348792 A1 * | 12/2016 | Labbe | F01D 25/183 |
| 2017/0016350 A1 * | 1/2017 | Miller | F01D 25/183 |
| 2019/0093504 A1 | 3/2019 | Becoulet et al. | |

FOREIGN PATENT DOCUMENTS

| | | |
|---|---|---|
| EP | 3073135 A1 | 9/2016 |
| EP | 3623589 A1 | 3/2020 |

OTHER PUBLICATIONS

European Search Report for European Application No. 20168074.1 completed on May 18, 2020.

\* cited by examiner

*Primary Examiner* — Christopher Verdier
*Assistant Examiner* — Cameron A Corday
(74) *Attorney, Agent, or Firm* — Carlson, Gaskey & Olds, P.C.

(57) ABSTRACT

A gas turbine engine according to an exemplary aspect of the present disclosure includes, among other things, a bearing compartment, a seal runner, a seal configured to cooperate with the seal runner to seal the bearing compartment, and a catcher in contact with the seal runner to minimize deflection of the seal runner. A method is also disclosed.

2 Claims, 2 Drawing Sheets

SEAL RUNNER WITH DEFLECTOR AND CATCHER FOR GAS TURBINE ENGINE

STATEMENT REGARDING GOVERNMENT SUPPORT

This invention was made with Government support awarded by the United States. The Government has certain rights in this invention.

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. Various seals near the rotating shafts contain oil within bearing compartments, which include bearings and seals. During operation of the engine, the seals maintain compartment pressures and keep lubricating oil inside the various compartments.

SUMMARY

A gas turbine engine according to an exemplary aspect of the present disclosure includes, among other things, a bearing compartment, a seal runner, a seal configured to cooperate with the seal runner to seal the bearing compartment, and a catcher in contact with the seal runner to minimize deflection of the seal runner.

In a further non-limiting embodiment of e foregoing engine, the seal runner includes a tab in contact with the catcher.

In a further non-limiting embodiment of any of the foregoing engines, the seal runner includes an axially-extending portion configured to contact the seal, and the seal runner further includes a deflector projecting radially from an aft end of the axially-extending portion.

In a further non-limiting embodiment of any of the foregoing engines, the deflector is integrally formed with the seal runner.

In a further non-limiting embodiment of any of the foregoing engines, the tab is arranged adjacent the intersection of the axially-extending portion and the deflector.

In a further non-limiting embodiment of any of the foregoing engines, the tab is spaced radially-inward of the axially-extending portion.

In a further non-limiting embodiment of any of the foregoing engines, the engine includes a stack spacer arranged about a shaft of the gas turbine engine, and the catcher is integrally formed with the stack spacer.

In a further non-limiting embodiment of any of the foregoing engines, the catcher includes a first leg extending radially from the stack spacer and a second leg extending axially from a free end of the first leg such that the catcher is substantially L-shaped in cross-section.

In a further non-limiting embodiment of any of the foregoing engines, a radially inner surface of the second leg of the catcher is in contact with a radially outer surface of a tab of the seal runner.

In a further non-limiting embodiment of any of the foregoing engines, the first leg of the catcher includes at least one passageway configured to permit fluid to flow into the bearing compartment.

In a further non-limiting embodiment of any of the foregoing engines, the stack spacer includes at least one orifice configured to permit fluid to flow into a space between a radially inner surface of the seal runner and a radially outer surface of the stack spacer.

In a further non-limiting embodiment of any of the foregoing engines, the at least one orifice is configured to cause fluid to impinge upon the radially inner surface of the seal runner at a location opposite the interface between the seal and the seal runner.

In a further non-limiting embodiment of any of the foregoing engines, the stack spacer and seal runner are arranged such that, after fluid impinges on the radially inner surface of the seal runner, the fluid turns in an aft direction and flows toward the at least one passageway of the catcher, and ultimately through the at least one passageway of the catcher and into the bearing compartment.

In a further non-limiting embodiment of any of the foregoing engines, the shaft is rotatably supported by a plurality of bearings contained within the bearing compartment.

In a further non-limiting embodiment of any of the foregoing engines, the shaft is one of an inner shaft and an outer shaft of the gas turbine engine.

A method according to an exemplary aspect of the present disclosure includes, among other things, using a catcher to restrict deflection of a seal runner relative to a seal. The seal and seal runner are configured to seal a bearing compartment of a gas turbine engine.

In a further non-limiting embodiment of the foregoing method, the catcher is integrally formed with a stack spacer arranged relative to a shaft of the gas turbine engine.

In a further non-limiting embodiment of any of the foregoing methods, the seal runner includes a deflector integrally formed therewith and projecting radially from an axially-extending portion of the seal runner, and wherein the catcher contacts the seal runner adjacent the intersection of the deflector and the axially-extending portion.

In a further non-limiting embodiment of any of the foregoing methods, the method includes establishing a flow of fluid through an orifice in the stack spacer such that the flow of fluid impinges on a radially inner surface of the seal runner.

In a further non-limiting embodiment of any of the foregoing methods, the method includes turning the flow of fluid in an aft direction toward the catcher, and introducing the flow of fluid into the bearing compartment via a passageway in the catcher.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
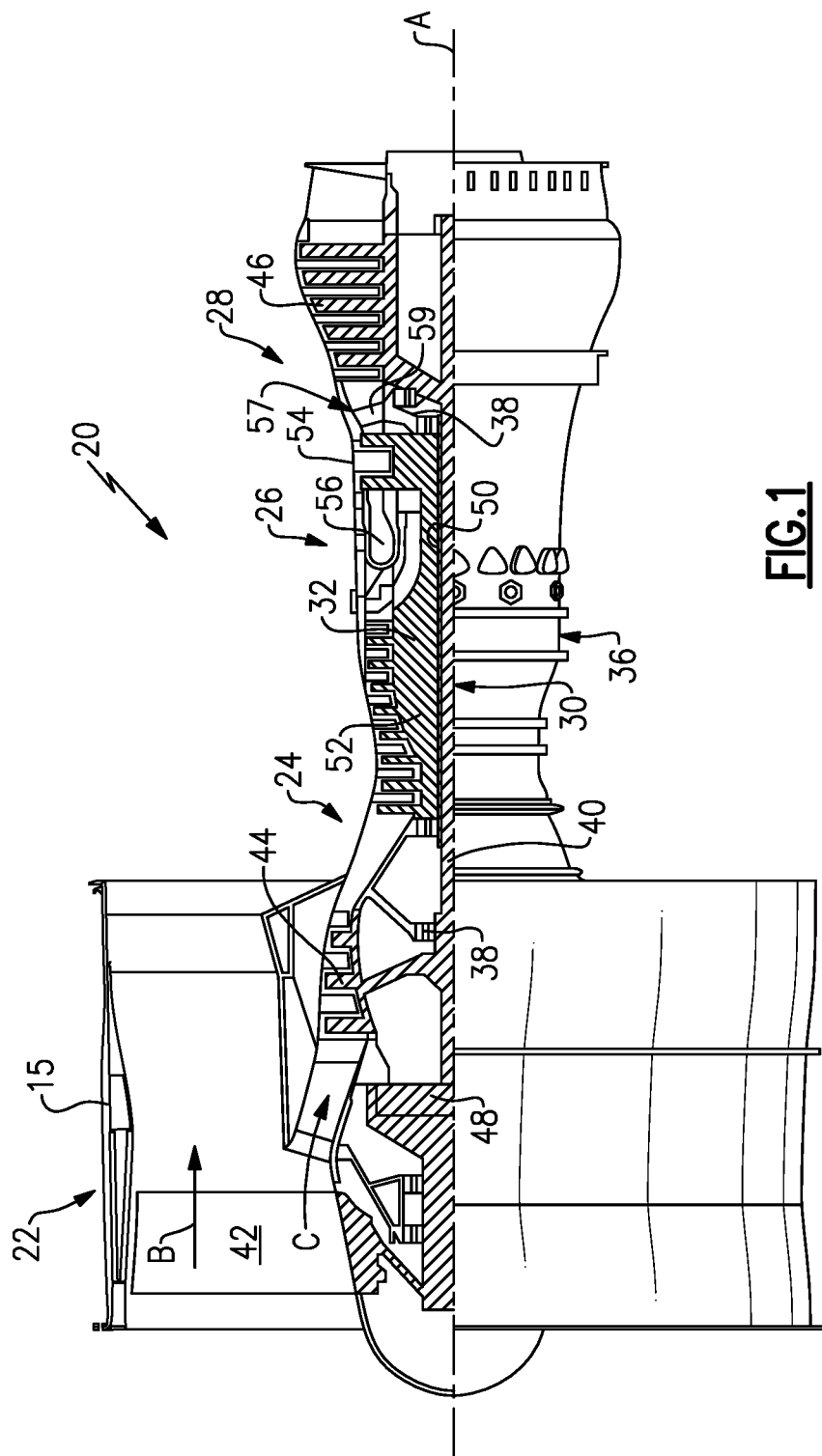
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54, A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°R)]^{0.5}$. The "Low corrected fan tip speed" as disclosed herein according to one non-limiting embodiment is less than about 1150 ft/second (350.5 meters/second).

Figure 2:
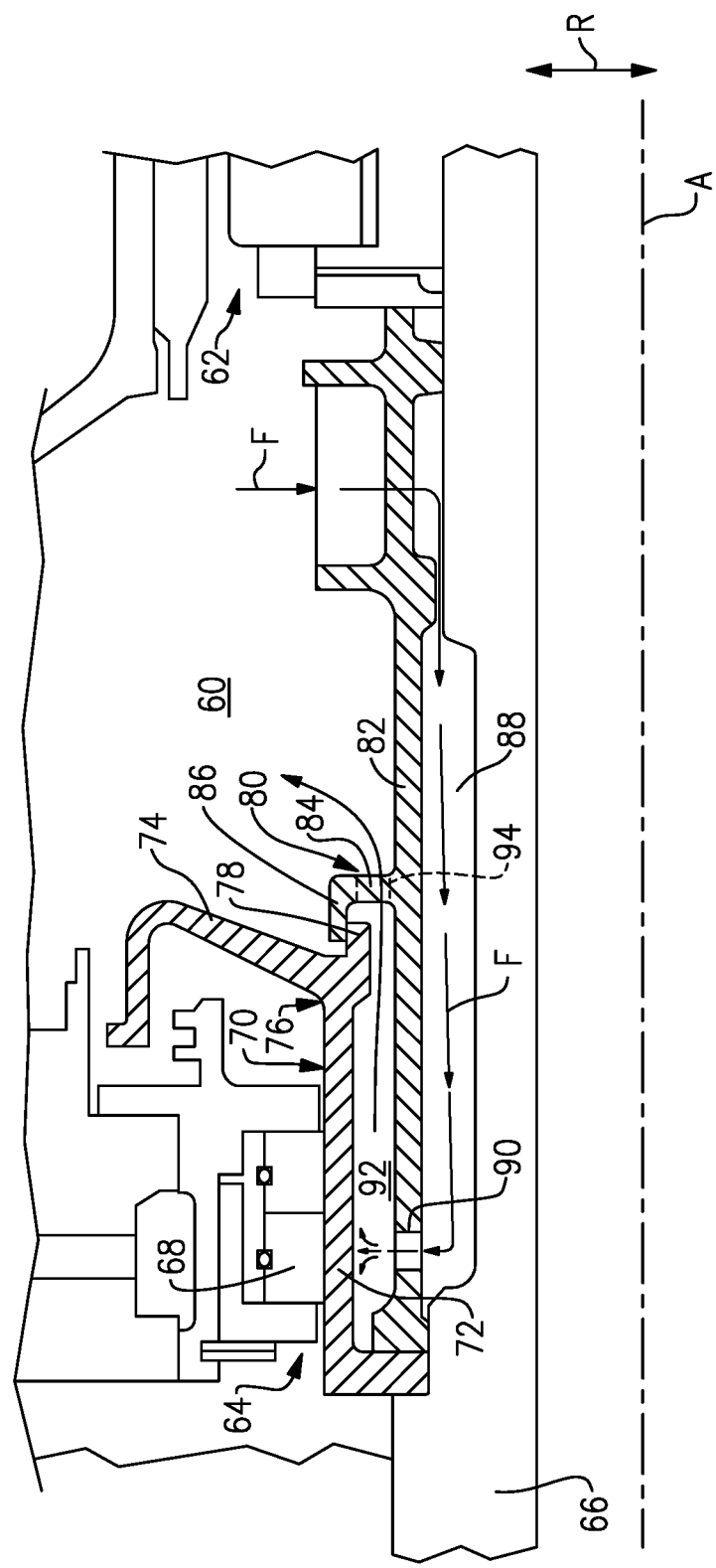
FIG. 2 illustrates a portion of the engine, and in particular illustrates a bearing compartment including a bearing assembly and a seal assembly.

FIG. 2 is a partial cross-sectional view of a bearing compartment 60 of the engine 20. The bearing compartment 60 includes a bearing assembly 62 and a seal assembly 64 configured to seal the bearing compartment 60 and maintain fluid pressure, particularly oil pressure, in the bearing compartment 60 during operation of the engine 20. As is known in the art, the bearing assembly 62 may include an inner race, an outer race, and rolling elements, such as balls, configured to roll therebetween. The bearing assembly 62 is mounted relative to a shaft 66 of the engine 20. The shaft 66 may be rotatably mounted about the engine central longitudinal axis A by one or more bearing assemblies, including additional bearing assemblies within the bearing compartment 60 or in other bearing compartments in the engine 20.

To this end, the bearing compartment 60 is representative of any bearing compartment within the engine 20. This disclosure is not limited to any specific bearing compartment, and in particular is not limited to a forward or an aft bearing compartment. Further, the shaft 66 represents either the inner shaft 40 or the outer shaft 50. This disclosure is not limited to bearing compartments at any particular engine location. Further, this disclosure applies outside the context of bearing compartments, and extends to other engine compartments that are sealed.

The seal assembly 64 includes a seal 68 and a seal runner 70 configured to cooperate with one another to establish a seal for the bearing compartment 60, and in particular to keep oil in the bearing compartment 60, which, in turn, maintains oil pressure in the bearing compartment 60. In this example, the seal 68 is mounted to a static structure, and therefore does not rotate during operation of the engine 20. The seal 68 may be circumferentially segmented and may be made of a carbon (C) material, however other materials come within the scope of this disclosure.

In this disclosure, the seal 68 can either contact the seal runner 70 or have a gap between the seal 68 and seal runner 70 during operation of the engine 20. In the latter example, the seal assembly 64 is known in the art as a non-contacting seal. In either case, the seal 68 and seal runner 70 are in a close relationship, and generate significant heat during operation of the gas turbine engine 20. The relative spacing between the seal 68 and the seal runner 70 is important for maintaining pressure in the bearing compartment 60. Thus, this disclosure provides cooling for the seal assembly 64 and minimizes deflection of the seal runner 70, thereby maintaining a relatively constant spacing between the seal 68 and seal runner 70.

The seal runner 70 of this disclosure includes an axially-extending portion 72 adjacent the seal 68, and a deflector 74 that projects radially from an aft end 76 of the axially-extending portion 72. In this disclosure "axially" refers to a direction substantially parallel to the engine central longitudinal axis A, and "radially" refers to directions normal thereto. The radial direction R is labeled in FIG. 2 for ease of reference.

The deflector 74 is integrally formed with the seal runner 70 in this example. The deflector 74 serves to keep oil in the bearing compartment 60, by deflecting a majority of the oil in the bearing compartment 60 away from the seal assembly 64, While beneficial, the deflector 74 does add to the weight of the seal runner 70, which may cause undesired deflection of the seal runner 70 during operation of the engine 20.

In this disclosure, the seal runner 70 includes a tab 78 configured to contact a catcher 80, which will be described below. The tab 78 is arranged adjacent the intersection of the axially-extending portion 72 and the deflector 74 (i.e., adjacent the aft end 76). The tab 78 projects radially inward of the axially-extending portion 72 and, adjacent the aft end 76, projects aft of the deflector 74. While in FIG. 2 the tab 78 projects radially inward from the axially-extending portion 72, the tab 78 could be radially in-line with the axially-extending portion 72 in another embodiment.

The catcher 80 is configured to contact the tab 78 and thereby substantially restrict, if not eliminate altogether, deflection of the seal runner 70. In this example, the catcher 80 is integrally formed with a stack spacer 82 arranged about the shaft 66. In other examples, the catcher 80 is not integrally formed with the stack spacer 82, but is instead attached thereto by a known technique such as welding.

The catcher 80 in this example has a substantially L-shaped cross-section, and in particular includes a first leg 84 extending radially from the remainder of the stack spacer 82, and a second leg 86 extending axially forward from a free end of the first leg 84. The L-shaped cross-section of the catcher 80 makes the catcher 80 particularly suited to receive the tab 78, and thereby prevent radial deflection of the seal runner 70. In particular, in FIG. 2, a radially inner surface of the second leg 86 of the catcher 80 is in direct contact with a radially outer surface of a tab 78 of the seal runner 70.

In addition to preventing deflection, this disclosure also provides for enhanced cooling of the seal assembly 64. Oil F is configured to circulate within the bearing compartment 60 during operation of the engine 20. In this example, oil F is introduced into the bearing compartment 60, and is used to cool the seal assembly 64. For instance, oil F is configured to flow in an axially forward direction in a space 88 radially between the stack spacer 82 and the shaft 66. Adjacent the seal assembly 64, the stack spacer 82 includes at least one orifice 90 configured to cause oil F to flow therethrough in the radial direction R such that the oil F impinges upon the inner surface of the seal runner 70 at a location adjacent the interface of the seal 68 and the seal runner 70. The impingement cooling effect absorbs significant heat from the seal assembly 64.

Next, the oil F turns aft and flows in a space 92 radially between the seal runner 70 and the stack spacer 82 toward the catcher 80. In this example, the first leg 84 of the catcher 80 includes a plurality of passageways 94 extending therethrough and configured to permit the oil F to flow from space 92 into the bearing compartment 60. Alternatively, the catcher 80 does not include spaces therethrough, and instead the stack spacer 82 could include a number of circumferentially spaced-apart catchers. In that instance, the oil F would flow into the bearing compartment 60 by passing between the catchers.

It should be understood that terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a bearing compartment;
   a seal runner;
   a seal configured to cooperate with the seal runner to seal the bearing compartment;
   a catcher in contact with the seal runner to minimize deflection of the seal runner; and
   a stack spacer arranged about a shaft of the gas turbine engine, wherein the catcher is integrally formed with the stack spacer,
   wherein the catcher includes a first leg extending radially from the stack spacer and a second leg extending axially from a free end of the first leg such that the catcher is substantially L-shaped in cross-section,
   wherein a radially inner surface of the second leg of the catcher is in contact with a radially outer surface of a tab of the seal runner,
   wherein the first leg of the catcher includes at least one passageway configured to permit fluid to flow into the bearing compartment,
   wherein the stack spacer includes at least one orifice configured to permit fluid to flow into a space between a radially inner surface of the seal runner and a radially outer surface of the stack spacer, wherein the at least one orifice is configured to cause fluid to impinge upon the radially inner surface of the seal runner at a location opposite the interface between the seal and the seal runner, wherein the stack spacer and seal runner are arranged such that, after fluid impinges on the radially inner surface of the seal runner, the fluid turns in an aft direction and flows toward the at least one passageway of the catcher, and ultimately through the at least one passageway of the catcher and into the bearing compartment.

2. A method, comprising:

using a catcher to restrict deflection of a seal runner relative to a seal, wherein the seal and seal runner are configured to seal a bearing compartment of a gas turbine engine, wherein the seal runner includes a tab in contact with the catcher, wherein the catcher is integrally formed with a stack spacer arranged relative to a shaft of the gas turbine engine, wherein the seal runner includes a deflector integrally formed therewith and projecting radially from an axially-extending portion of the seal runner, and wherein the catcher contacts the seal runner adjacent the intersection of the deflector and the axially-extending portion;

establishing a flow of fluid through an orifice in the stack spacer such that the flow of fluid impinges on a radially inner surface of the seal runner;

turning the flow of fluid in an aft direction toward the catcher; and introducing the flow of fluid into the bearing compartment via a passageway in the catcher.

* * * * *